Dec. 30, 1930.  E. V. HAWKINS  1,786,998
BASKET
Filed March 18, 1929

Inventor
Ernest V. Hawkins
By Eugene M. Giles
Attorney.

Patented Dec. 30, 1930

1,786,998

UNITED STATES PATENT OFFICE

ERNEST V. HAWKINS, OF MITCHELL, INDIANA

BASKET

Application filed March 18, 1929. Serial No. 347,759.

My invention relates to baskets or containers of the type used for packing and shipping fruit, vegetables and the like, and has reference more particularly to handle type fasteners, whereby the cover is secured in place on the basket.

In baskets of the above character, it is a common practice to employ wire handles which are attached to the rim of the basket at opposite sides and the basket cover has a slat with projecting ends which are engaged with the handles to hold the cover in place. When the cover is applied, the basket handle is pushed outwardly to engage over the end of the slat and this bends the wire to such an extent that upon straightening up the basket handle, the parts thereof at the inner side of the basket rim, swing inwardly and afford projections which oftentimes puncture or otherwise injure the contents of the basket. With my invention the cover is applied in the same manner but the parts at the inner side of the basket rim are effectively locked against any displacement which might injure the contents of the basket.

The principal objects of my invention are to provide an improved wire handle for use in carrying and otherwise handling the basket and which may also serve for attaching a cover to a basket or the like; to avoid injury to the contents of the basket by the handle or cover fastener; to lock the handles more securely in place on the basket; and in general to provide a simple and inexpensive cover fastener or handle construction which avoids difficulties experienced with cover fasteners heretofore.

Figure 1:
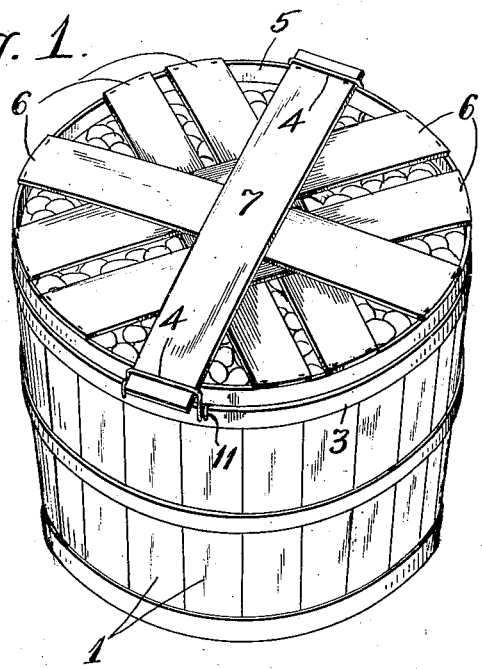
Fig. 1 is a perspective view of a basket embodying my invention.
Figure 2:
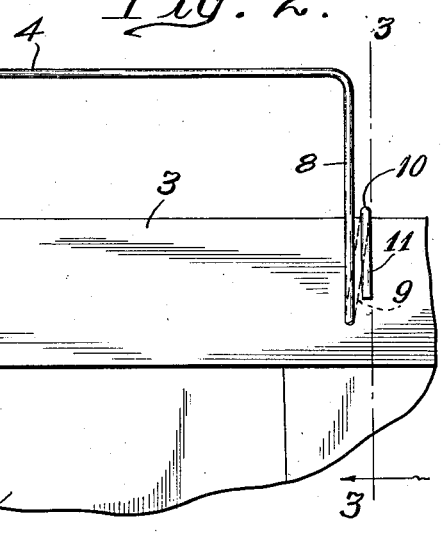
Fig. 2 is an enlarged fragmentary view of the upper edge of the basket showing an exterior view of my improved handle.

Referring to the drawings, I have shown for the purpose of illustration a basket of a common form having side walls of staves 1, the upper ends of which are engaged between inner and outer hoops 2 and 3 respectively. A pair of handles 4 are secured at diametrically opposite places to the rim of the basket and these handles serve additionally to hold the basket cover in place. The basket cover is usually made of a hoop 5 to the upper edge of which are secured a number of crossed slats 6, one of which indicated at 7 has the ends extended beyond the hoop 5 to engage with the handles 4 for holding the cover in place.

In attaching the basket cover, one of the projecting ends of the slat 7 is engaged with one of the handles 4, whereupon the other handle 4 must be swung outwardly a considerable distance to engage over the end of the slat 7. With handles of previous construction this not only loosened up the connection of the handle with the basket but bent the wire to such an extent that when the handle was straightened up, the portions at the inner side of the basket rim swung inwardly and afforded projections which oftentimes damaged the contents of the basket.

Figure 3:
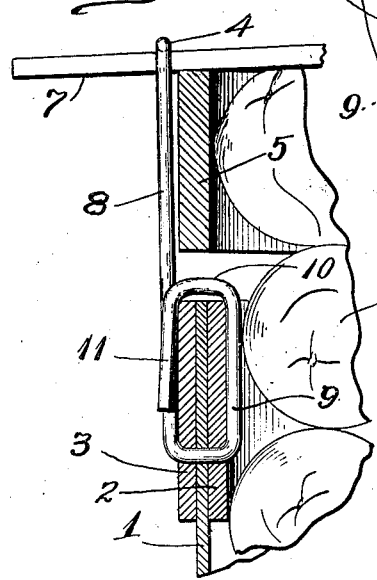
Fig. 3 is an enlarged sectional view taken substantially on the line 3—3 of Fig. 2, and showing a portion of the basket cover.

In my construction, the legs 8 of the handle extend downwardly along the outer side of the outer hoop 3, then inwardly through the hoops 2 and 3 preferably at a sufficient distance above the lower edges thereof as in present handles to afford a secure anchorage for the handles. The wire is then bent upwardly as at 9 against the inner side of the hoop 2 and terminates in a portion 10 which extends across the tops of the hoops 2 and 3 and terminates in a portion 11 which is bent downwardly against the outer side of the hoop 3 and clamped thereagainst, so as to secure and anchor in place the free ends of the legs of the handle at the exterior of the basket; thereby to prevent the free end portions of the legs from becoming loosened and displaced with the consequent loosening and projecting of the parts of the legs within the basket away from the basket wall and into the interior of the basket to the injury of the contents thereof as the result of the manipulations to which the handle is subject in the handling of the basket by the use of the handles and also in engaging the fastening members of the cover with the loop portions of the handles. Thus each of the legs 8 has a closed loop engaging the basket rim with the portion 9 at the inner side of the basket rim locked at each end against separation therefrom. With this construction, when the basket handle 4 is bent outwardly to engage over the projecting end of the slat 7 the portions 9, 10 and 11 remain securely engaged with the basket rim and when the handle 4 is straightened up after engagement with the end of the slat 7 there is no displacement of the inner portion 9 from the basket rim and consequently no projecting portions result which will injure the contents of the basket. In previous handle structures however, which did not have the portion 11 or the portions 10 and 11 the outward bending of the handle loosened up the connection of the handle with the basket, the hooped upper edge structure being somewhat yieldable in this respect, and the arms 8 assumed an angle to the portions 9 so that when the handle was straightened up the inside portions 9 (without 10 and 11) would swing inwardly and puncture or damage any adjoining articles such as indicated at 12 in Fig. 3 of the drawing.

In addition to the improved result of avoiding injury to the contents of the basket, this handle has the further advantage of holding the cover more securely in place against accidental displacement. It is a common practice to employ what is known as a bulge pack, the basket being filled overly full and the cover sprung into place so that it has an arched form and is under tension when attached to the basket. This gives to the slat 7 a correspondingly arched form and if the handles have been loosened in applying the cover, as they usually were with previous handles, they would frequently become accidentally disengaged from the ends of the slat 7. With my construction however there is no loosening up of the attachment of the handle to the rim of the basket when the handle is swung outwardly and engaged over the end of the slat 7 but when the handle is bent back, it is held in the upright position by the stiffness of the metal which serves to hold the handles against disengagement from the projecting ends of the slat 7.

As above indicated, it is customary to utilize the basket handles for engaging the ends of the basket slat and I have shown and described my invention accordingly.

While I have shown and described my invention in a preferred form I am aware that various changes and modifications may be made without departing from the principles of my invention, the scope of which is to be determined by the appended claims.

I claim as my invention:

1. A shipping basket provided with an inverted substantially U-shaped wire handle rising above the top edge of the basket, the leg members of the handle extending downwardly along the outer side of the basket body and thence inwardly through the wall of the basket body, thence upwardly along the inner side of the basket wall, thence outwardly across the top edge of the basket wall, and thence downwardly along the outer side of the basket body, whereby the wire leg portions on the interior of the basket are held in position and prevented from becoming displaced and projected away from the basket wall and into the interior of the basket to the injury of the contents of the basket as the result of the manipulations to which the handle is subject in the handling of the basket by the use of the handle.

2. A shipping basket, comprising a basket body, a cover therefor having horizontal fastening elements projecting a distance beyond the periphery of the cover, and combined handles and cover-fasteners secured upon the exterior of the basket body, each handle and cover-fastener having an inverted substantially U-shaped wire loop rising above the top of the basket and embracing the projecting portion of one of the fastening elements of the cover, the legs of the wire loop extending downwardly along the outer side of the basket body and free to be bent outwardly therefrom, and said legs extending inwardly through the wall of the basket body, and thence along the inner side of the basket body, and means lying against the exterior of the basket body and connected to the leg portions on the interior of the basket for securing the inner leg portions against the inner side of the wall of the basket to prevent said inner leg portions from becoming displaced and projected away from the basket wall and into the interior of the basket to the injury of the contents of the basket as the result of the manipulations to which the combined handles and cover-fasteners are subject in the handling of the basket by the use of the handles and in the engagement of the projecting ends of the fastening elements on the cover with the loops of the handles.

3. A shipping basket, comprising a basket body, a cover therefor having horizontal fastening elements projecting a distance beyond the periphery of the cover, and combined handles and cover-fasteners secured upon the exterior of the basket body, each handle and cover-fastener having an inverted substantially U-shaped wire loop rising above the top of the basket and embracing the projecting portion of one of the fastening elements of the cover, the legs of the wire loop extending downwardly along the outer side of the basket body and free to be bent outwardly therefrom, and said legs extending inwardly through the wall of the basket body, thence along the inner side of the basket body, thence outwardly across the top edge of the basket body between the body and the cover, and thence downwardly along the outer side of the basket body, whereby the wire leg portions on the interior of the basket are held in position and prevented from becoming displaced and projected away from the basket wall and into the interior of the basket to the injury of the contents of the basket as the result of the manipulations to which the combined handles and cover-fasteners are subject in the handling of the basket by the use of the handles and in the engagement of the projecting ends of the fastening elements on the cover with the loops of the handles.

4. A shipping basket provided with an inverted substantially U-shaped wire handle rising above the top edge of the basket, the leg members of the handle extending downwardly along the outer side of the basket body and free to be bent outwardly therefrom, and said leg members extending inwardly through the side wall of the basket body and having portions of the leg members bent to lie alongside of the interior wall of the basket body, and means lying against the exterior of the basket body and connected with the leg portions on the interior of the basket for securing said inner leg portions against the inner wall of the basket and preventing them from becoming displaced and projected away from the basket wall and into the interior of the basket to the injury of the contents thereof as the result of the manipulations to which the handle is subject in the handling of the basket by the use of the handle.

ERNEST V. HAWKINS.